(12) United States Patent
Zhou et al.

(10) Patent No.: US 8,556,052 B2
(45) Date of Patent: Oct. 15, 2013

(54) SPRING LEAF AND OVERRUNNING CLUTCH PROVIDED WITH THE SAME

(75) Inventors: Xuegang Zhou, Jiangsu (CN); Qing Xue, Jiangsu (CN); Jianwei Shi, Jiangsu (CN)

(73) Assignee: Jiangsu Nanfang Bearing Co., Ltd., Changzhou, Jiangsu (CN)

( * ) Notice: Subject to any disclaimer, the term of this patent is extended or adjusted under 35 U.S.C. 154(b) by 0 days.

(21) Appl. No.: 13/147,994

(22) PCT Filed: Nov. 27, 2009

(86) PCT No.: PCT/CN2009/001341
§ 371 (c)(1),
(2), (4) Date: Aug. 4, 2011

(87) PCT Pub. No.: WO2011/054134
PCT Pub. Date: May 12, 2011

(65) Prior Publication Data
US 2012/0279817 A1    Nov. 8, 2012

(30) Foreign Application Priority Data
Nov. 4, 2009   (CN) .......................... 2009 1 0213509

(51) Int. Cl.
*F16D 15/00* (2006.01)
(52) U.S. Cl.
USPC .................................................... 192/45.001
(58) Field of Classification Search
USPC ....................................... 192/48.008, 45.015
See application file for complete search history.

(56) References Cited

U.S. PATENT DOCUMENTS

| 3,404,760 | A | * | 10/1968 | Benson et al. | ............ 192/45.012 |
| 7,137,497 | B2 | * | 11/2006 | Wehr et al. | ............... 192/45.008 |
| 2007/0119676 | A1 | * | 5/2007 | Altmann | .......................... 192/45 |

FOREIGN PATENT DOCUMENTS

| CN | 101260913 A | 9/2008 |
| CN | 101561039 A1 | 10/2009 |
| JP | 2001304299 A | 10/2001 |

*Primary Examiner* — David D Le
*Assistant Examiner* — David J Hlavka
(74) *Attorney, Agent, or Firm* — Morris, Manning & Martin LLP; Tim Tingkang Xia, Esq.

(57) ABSTRACT

A spring leaf and an overrunning clutch provided with the same are provided. The spring leaf is made up of a support strip (3-1), a clamping strip (3-2), and a connection beam (3-3). The support strip (3-1) supports a needle roller in suspension. The connection beam (3-3) connects the support strip (3-1) with the clamping strip (3-2). The main body of the clamping strip (3-2) is a straight strip (3-2-1), either end of which is provided with a V-shaped bended part (3-2-2). The overrunning clutch is provided with a retainer, multiple needle rollers, and multiple spring leaves. Mounting grooves for the spring leaves are respectively disposed at positions, corresponding to each crossbeam, on outer end surfaces of a first and a second annular end edge at both ends of a window hole of the retainer. The bottom of the mounting groove for the spring leaf is V-shaped when cut along an axial direction of the retainer. An inner surface of the straight strip (3-2-1) of the clamping strip (3-2) of the spring leaf is matched with an outer surface of the crossbeam. An inner surface of the V-shaped bended part (3-2-2) of the clamping strip (3-2) is matched with a bottom surface of the mounting groove for the spring leaf. The technical problem of the potential displacement and detachment of the spring leaf during the reciprocation of the existing overrunning clutch at a high rotational speed and high frequency is solved by the invention.

3 Claims, 3 Drawing Sheets

SPRING LEAF AND OVERRUNNING CLUTCH PROVIDED WITH THE SAME

BACKGROUND OF THE INVENTION

1. Field of Invention

The present invention relates to a spring leaf and an overrunning clutch provided with the same.

2. Related Art

An overrunning clutch is a clutch that automatically engages or disengages when the relative moving speed of a driving part and a follower part changes or the reciprocation direction changes; and is a basic component in the mechanical transmission of Mechanical & Electrical Integration. The major functions of the overrunning clutch are backstopping, accurate positioning, torque transmission, or breaking the torque, so the overrunning clutch is also referred to as a backstop or one-way bearing, which is widely applied in the machine tools, packaging machines, printing machines, light industry machines, textile machines, petrochemical machines, cement machines, metallurgical machines, transportation machines, reducers, and the like. The overrunning clutch has a great varieties, among which the ratchet overrunning clutch, needle roller overrunning clutch, and sprag overrunning clutch are the most commonly used. The structure of the needle roller overrunning clutch includes an inner ring, an outer ring, a needle roller, and a spring. The needle roller keeps the overrunning clutch at a ready to work state depending on the elasticity of the spring, and the spring provides a buffer effect for the needle roller, thereby ensuring sustained stable running of the overrunning clutch. Therefore, the shape and structure of the spring and the installation and fixing manner thereof exert great impact on the performance index such as the sustained running stability and using lifespan of the clutch, and thus the spring is a critical part of the overrunning clutch. The spring is required to maintain the sustained elastic restoring force and meanwhile provide a good anti-fatigue performance, and is reliably positioned and fixed in the overrunning clutch. Therefore, the overrunning clutch manufacturers are devoted themselves to the research of the spring structure of the overrunning clutch and the installation and fixing manners thereof. For example, Chinese Patent No. CN2206861Y discloses a "Double Needle Roller One-way Break Clutch", in which the spring of the double needle roller one-way break clutch is an oval spring leaf, and is placed in the slot of the needle roller hole in the needle roller stand, for pressing the needle roller. The needle roller stand of the structure is difficult to manufacture. As the spring leaf is only placed in the raised slot of the needle roller hole in the needle roller stand, under the condition of a high rotational speed, there is a risk of detachment displacement failure of the spring leaf. Chinese Patent No. CN2252910Y discloses a "Sealed One-way Stop Assembled Clutch", in which the spring of the sealed one-way stop assembled clutch is an S-shaped flat spring. Likewise, this structure has the deficiency that the retainer is difficult to fabricate. U.S. Pat. No. 6,170,626 discloses an overrunning clutch, in which the spring structure is a spring leaf with arc-shaped front ends for supporting the needle roller, and back ends of the spring leaf form an elastic clamp, for buckling the spring on the crossbeam of the retainer. This spring structure can improve the bearing capability of the spring to some extent, but the elastic clamp at the back end buckles the spring on the crossbeam of the retainer, so that when the rotational speed is high, there is a risk that the elastic clamp may be disengaged from the crossbeam of the retainer under the centrifugal force. The tail end of the arc spring leaf is formed by punching, and the end surface of the tail end after being bent is in contact with a supported roller at an acute angle, which in use, may easily cause the abrasion of the partial surface of the needle roller and generate noises. Meanwhile, the tail end of the arc spring leaf may also be easily abraded, which causes insufficient elasticity supported on the needle roller and loses the function of the overrunning clutch. Japanese Patent No. JP2006-226318A also discloses some spring leaf structures used in the overrunning clutch. However, the part of the spring leaves for supporting the needle roller in suspension is foldable. After a force is applied on the spring leaves, the folded root may be easily broken. Besides, the potential displacement and detachment of the spring leaf exist during the reciprocation of the clutch at a high rotational speed and high frequency. For example, referring to FIGS. 8, 9, and 10, as the spring leaf is suspended on the crossbeam of the retainer, the spring leaf and the retainer may generate a certain displacement in the axial direction, so the elasticity of the spring leaf received by the needle roller in movement is unstable. Moreover, during the reciprocation of the clutch at a high rotational speed and high frequency, the spring leaf is impacted by the needle roller, which easily causes the displacement and detachment. In addition, the part of the spring leaf that supports the needle roller in suspension is a bending part formed by punching, and when the spring leaf is under a force in operation, the folded root may be easily broken, resulting in a defective product. Further, as shown in FIGS. 3, 4, 5, 6, 7, and 12*b*, the contact position of the spring leaf and the needle roller is located at the middle part of the needle roller instead of being close to the end part, so the force received by the needle roller in movement is uneven, which may easily cause tilting of the needle roller.

SUMMARY OF THE INVENTION

To solve the technical problem of the potential displacement and detachment of the spring leaf of the prior overrunning clutch at a high rotational speed, the present invention provides a spring leaf and an overrunning clutch provided with the same, which ensures the sustained stability of the overrunning clutch in running when the spring leaf and the retainer are mated to be stably and reliably fixed on the retainer.

In a technical solution of the present invention for solving the technical problem, a spring leaf is mainly used in an overrunning clutch, and mounted on a retainer of the overrunning clutch for supporting a needle roller in suspension. The spring leaf is made up of a support strip, a clamping strip, and a connection beam. The support strip supports the needle roller in suspension. The connection beam connects the support strip with the clamping strip. The main body of the clamping strip is a straight strip, either end of which is provided with a V-shaped bended part. An inner surface of the V-shaped bended part of the clamping strip of the spring leaf is matched with a bottom surface of a mounting groove for the spring leaf. The mounting grooves for the spring leaves are respectively disposed at positions, corresponding to each crossbeam, on outer end surfaces of a first and a second annular end edge of the retainer. The V-shaped bended part on either end of the clamping strip of the spring leaf is clamped on the retainer, so that the spring leaf is reliably fixed on the retainer, thus ensuring that the spring leaf is not deviated from the correct working position in operation under frequent impacts or a centrifugal force.

A middle part of the support strip of the spring leaf is a straight segment, either end of which is provided with an arc segment. The straight segment intersects with the two arc segments respectively, and end surfaces of the two arc segments of the support strip support the needle roller in suspension. The number of the connection beams is two, and the connection beam is in a flat 7-shape. One end of the connection beam is connected to an end surface of the straight strip of the clamping strip, and the other end of the connection beam is connected to an end surface of the straight segment of the support strip. The position where the connection beam and the support strip are connected is close to the position where the straight segment and the arc segment are connected. The expanded length of the arc segment of the support strip is identical to or substantially the same as that of the straight segment. The middle part of the support strip of the spring leaf is the straight segment, either end of which is provided with the arc segment, thus improving the rigidity of the support strip of the spring leaf. The two connection beams are used to connect the clamping strip and the support strip, so that the arc segment at either end of the support strip is individually supported, and receives a stable force.

An overrunning clutch provided with the spring leaf includes a retainer, multiple needle rollers, and multiple spring leaves. The retainer includes a first and a second annular end edge separated along a common axial direction, crossbeams connecting the two annular end edges, and a window hole formed between the annular end edges and the crossbeams for retaining the needle roller. Mounting grooves for the spring leaves are respectively disposed at positions, corresponding to each crossbeam, on outer end surfaces of the first and second annular end edges. The bottom of the mounting groove for the spring leaf is V-shaped when cut along an axial direction of the retainer. The spring leaf is made up of a support strip, a clamping strip, and a connection beam. The support strip supports the needle roller in suspension. The connection beam connects the support strip with the clamping strip. The main body of the clamping strip is a straight strip, either end of which is provided with a V-shaped bended part. An inner surface of the V-shaped bended part of the clamping strip is matched with a bottom surface of the mounting groove for the spring leaf. The V-shaped bended part on either end of the clamping strip of the spring leaf is clamped on the retainer, so that the spring leaf is reliably fixed on the retainer, thus ensuring that the spring leaf is not deviated from the correct working position in operation under frequent impacts or a centrifugal force.

In a free state, an angle formed between the V-shaped bended part and the straight strip of the clamping strip is slightly smaller than an angle formed between the bottom surface of the mounting groove for the spring leaf and the outer surface of the crossbeam. Generally, the angle formed between the V-shaped bended part and the straight strip of the clamping strip is 5° to 15° smaller than the angle formed between the bottom surface of the mounting groove for the spring leaf and the outer surface of the crossbeam. Through the proper elasticity of the V-shaped bended part, the clamping strip of the spring leaf may be reliably clamped on the retainer.

The present invention has the following effects. The spring leaf of the present invention has a simple structure, and is convenient to fabricate and install. Through the V-shaped bended part at either end of the clamping strip of the spring leaf clamped on the retainer, the spring leaf may be reliably fixed on the retainer, thereby ensuring that the spring leaf is not deviated from the correct working position in operation under frequent impacts or a centrifugal force. No relative displacement is generated between the spring leaf and the retainer, and correspondingly, the elasticity received by the needle roller is relatively stable. The V-shaped bended part at either end of the spring leaf is fixed on the retainer, thereby providing an axial direction limitation function and preventing the axial direction displacement of the spring leaf. The middle part of the support strip of the spring leaf is the straight segment, either end of which is provided with the arc segment, thus improving the rigidity of the support strip of the spring leaf. The two connection beams are used to connect the clamping strip and the support strip, so that the arc segment at either end of the support strip is individually supported, receives a stable force, and has a large bearing capacity.

BRIEF DESCRIPTION OF THE DRAWINGS

The present invention will become more fully understood from the detailed description given herein below for illustration only, and thus are not limitative of the present invention, and wherein.

In the figures, 1. retainer, 1-1. crossbeam, 1-2. annular end edge, 1-2-1. mounting groove for the spring leaf, 1-3. window hole, 2. needle roller, 3. spring leaf, 3-1. support strip, 3-1-1. straight segment, 3-1-2. arc segment, 3-2. clamping strip, 3-2-1. straight strip, 3-2-2. V-shaped bended part, α. angle formed between the V-shaped bended part and the straight strip, α'. angle formed between the bottom surface of the mounting groove for the spring leaf and the outer surface of the crossbeam, 3-3. connection beam, 4. inner ring, and 5. outer ring.

DETAILED DESCRIPTION OF THE INVENTION

Figure 1:
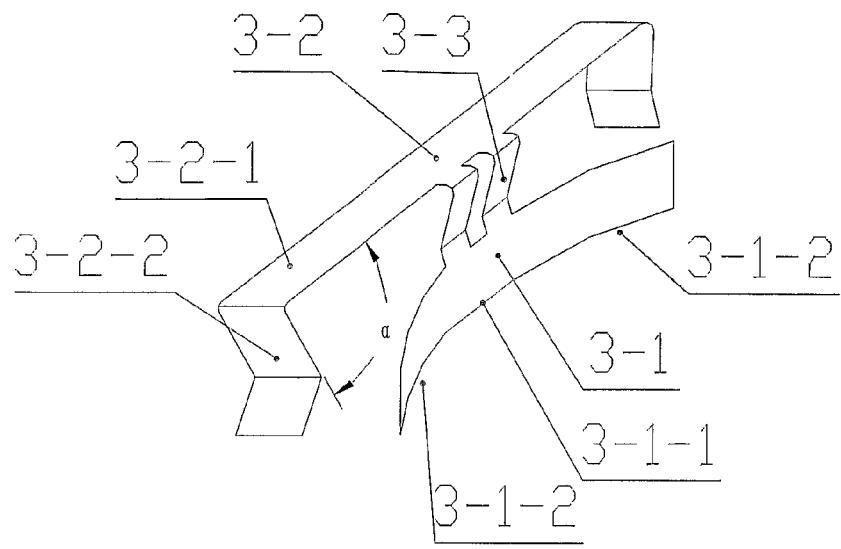
FIG. 1 is a schematic structural view of a spring leaf according to the present invention.
Figure 2:
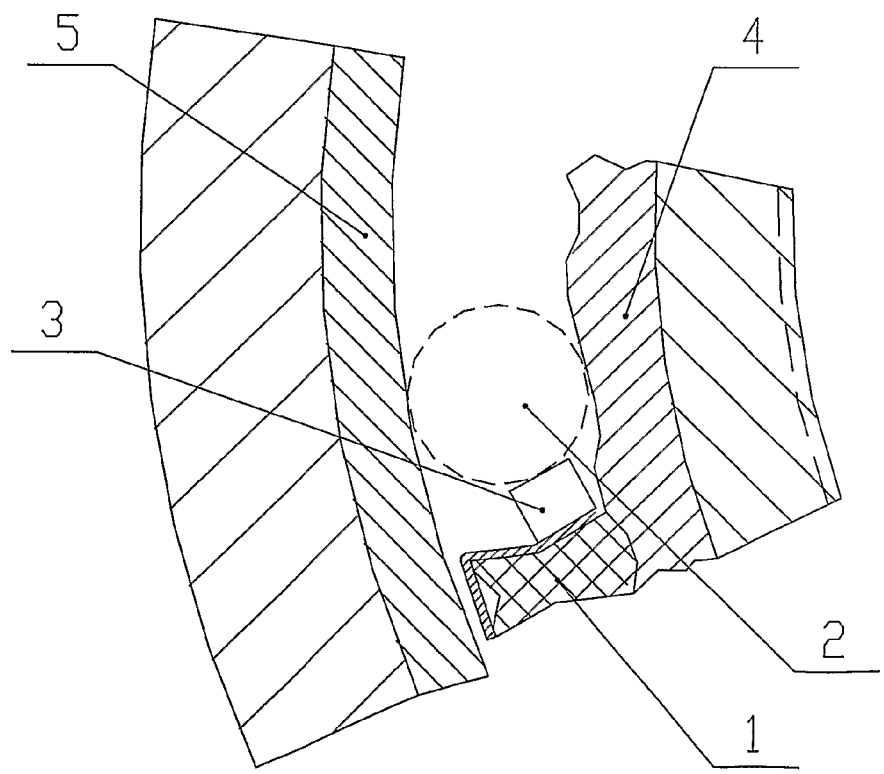
FIG. 2 is a schematic structural view of an overrunning clutch according to the present invention.
Figure 3:
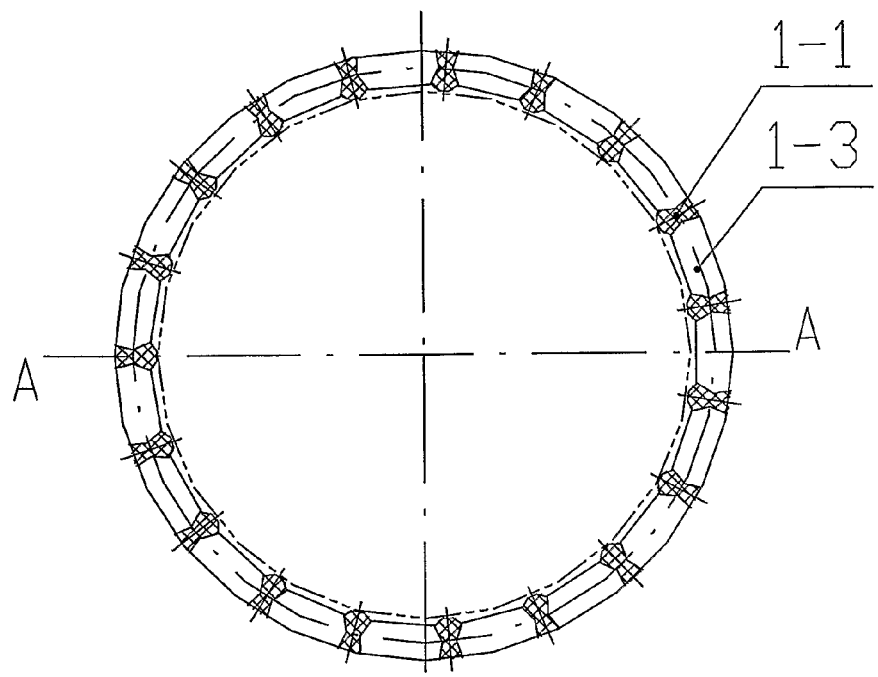
FIG. 3 is a schematic structural view of a retainer according to the present invention.
Figure 4:
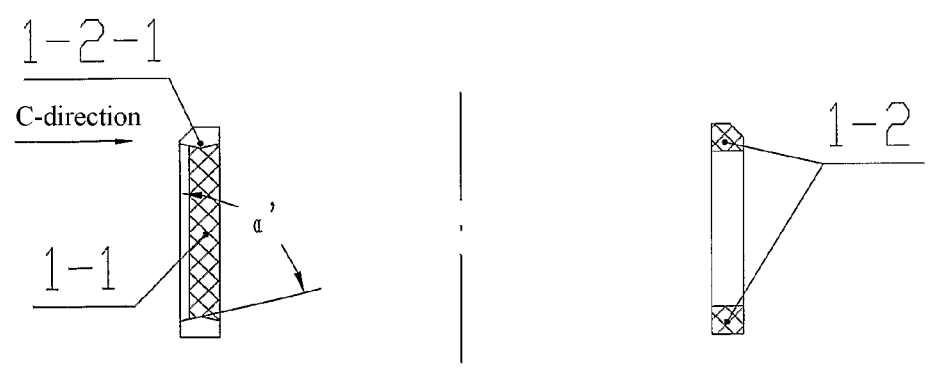
FIG. 4 is a cross-sectional view of FIG. 3 taken along Line A-A.
Figure 5:
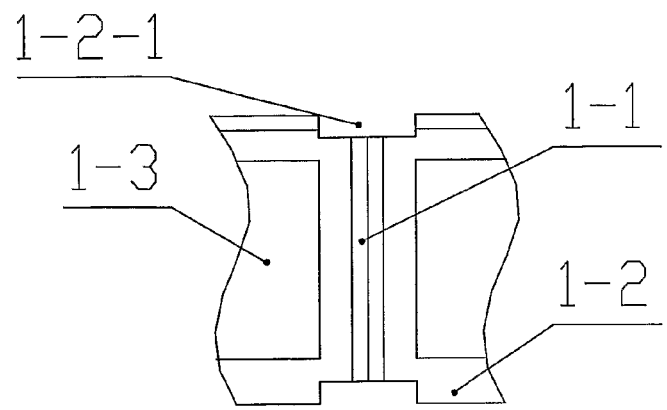
FIG. 5 is a C-direction view of FIG. 4.
Figure 6:
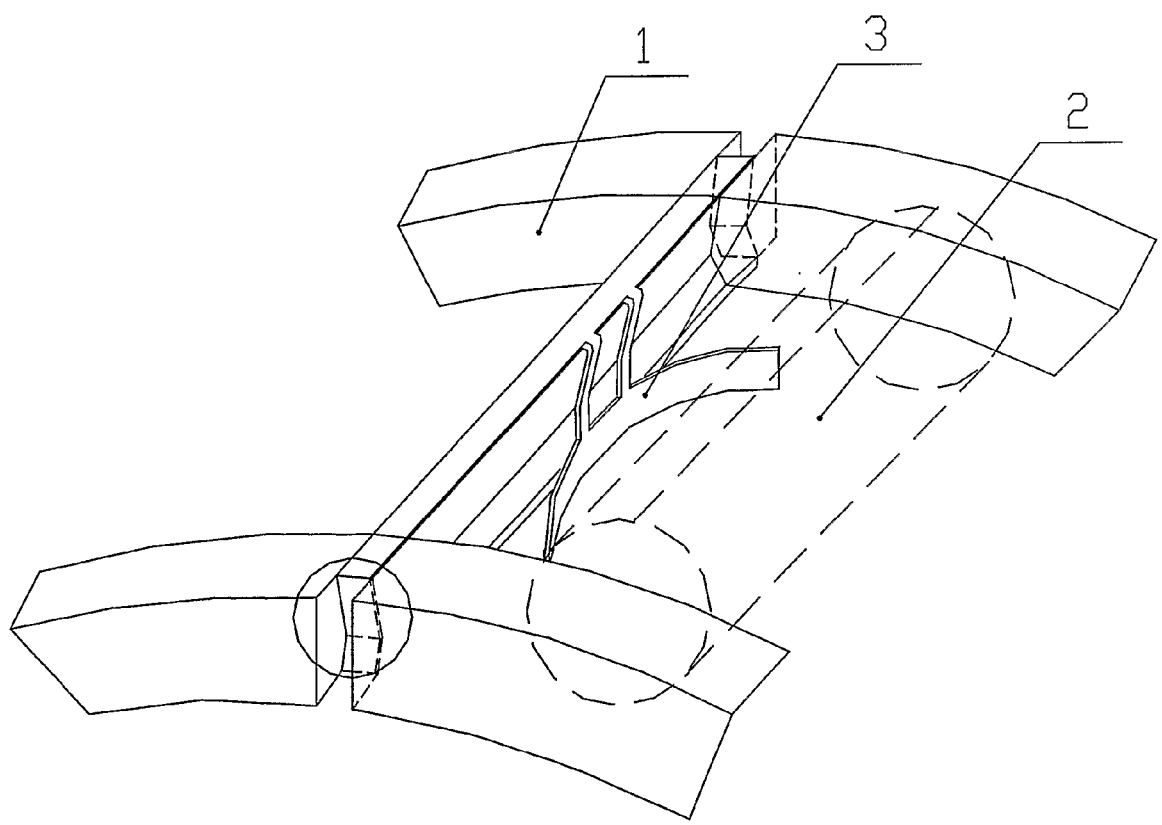
FIG. 6 is a schematic structural view of connection of a spring leaf and a retainer according to the present invention.

FIG. 1 illustrates an exemplary embodiment of a spring leaf according to the present invention. The spring leaf is made up of a support strip 3-1, a clamping strip 3-2, and two connection beams 3-3. The support strip 3-1 supports the needle roller 2 in suspension. The connection beams 3-3 connect the support strip 3-1 with the clamping strip 3-2, and are in a flat 7-shape. The main body of the clamping strip 3-2 is a straight strip 3-2-1, either end of which is provided with a V-shaped bended part 3-2-2. A middle part of the support strip 3-1 is a straight segment 3-1-1, either end of which is provided with an arc segment 3-1-2. The straight segment 3-1-1 respectively intersects with the two arc segments 3-1-2. End surfaces of the two arc segments 3-1-2 of the support strip 3-1 support the needle roller 2 in suspension. One end of the connection beam 3-3 is connected to an end surface of the straight strip 3-2-1 of the clamping strip, and the other end of the connection beam 3-3 is connected to an end surface of the straight segment 3-1-1 of the support strip 3-1. The position where the connection beam 3-3 and the support strip 3-1 are connected is close to the position where the straight segment 3-1-1 and the arc segment 3-1-2 are connected. The expanded length of the arc segment 3-1-2 of the support strip 3-1 is substantially the same as that of the straight segment 3-1-1. FIGS. 1-6 show an exemplary embodiment of an overrunning clutch according to the present invention. The overrunning clutch is provided with an inner ring 4, an outer ring 5, a retainer 1, multiple needle rollers 2, and spring leaves 3 whose number is the same as that of the needle rollers 2. The retainer 1 includes a first and a second annular end edge 1-2 separated along a common axial direction, crossbeams 1-1 connecting the two annular end edges 1-2, and a window hole 1-3 formed between the annular end edges 1-2 and the crossbeams 1-1 for retaining the needle roller 2. Mounting grooves for the spring leaves 1-2-1 are respectively disposed at positions, corresponding to each crossbeam 1-1, on outer end surfaces of the first and second annular end edges 1-2. The bottom of the mounting groove for the spring leaf 1-2-1 is V-shaped when cut along an axial direction of the retainer 1. The spring leaf 3 is made up of a support strip 3-1, a clamping strip 3-2, and a connection beam 3-3. The support strip 3-1 supports the needle roller 2 in suspension, and the connection beam 3-3 connects the support strip 3-1 with the clamping strip 3-2. The main body of the clamping strip 3-2 is a straight strip 3-2-1, either end of which is provided with a V-shaped bended part 3-2-2. An inner surface of the V-shaped bended part 3-2-2 of the clamping strip 3-2 is matched with a bottom surface of the mounting groove for the spring leaf 1-2-1. In a free state, an angle α formed between the V-shaped bended part 3-2-2 and the straight strip 3-2-1 of the clamping strip 3-2 is 6° smaller than an angle α' formed between the mounting groove for the spring leaf 1-2-1 and an outer surface of the crossbeam 1-1. Through the proper elasticity of the V-shaped bended part 3-2-2, the clamping strip 3-2 of the spring leaf 3 may be reliably clamped on the retainer 1, thus ensuring that the spring leaf is not deviated from the correct working position in operation under frequent impacts or a centrifugal force. No relative displacement is generated between the spring leaf and the retainer, and correspondingly, the elasticity received by the needle roller is relatively stable. A middle part of the support strip 3-1 is a straight segment 3-1-1, either end of which is provided with an arc segment 3-1-2. The straight segment 3-1-1 intersects with the two arc segments 3-1-2 respectively, and end surfaces of the two arc segments 3-1-2 of the support strip 3-1 support the needle roller 2 in suspension. The number of the connection beams 3-3 is two, and the connection beam is in a flat 7-shape. One end of the connection beam 3-3 is connected to an end surface of the straight strip 3-2-1 of the clamping strip, and the other end of the connection beam 3-3 is connected to an end surface of the straight segment 3-1-1 of the support strip 3-1. The position where the connection beam 3-3 is connected to the support strip 3-1 is close to the position where the straight segment 3-1-1 and the arc segment 3-1-2 are connected. The expanded length of the arc segment 3-1-2 of the support strip 3-1 is substantially the same as that of the straight segment 3-1-1. The middle part of the support strip 3-1 of the spring leaf 3 is the straight segment 3-1-1, either end of which is provided with the arc segment 3-1-2, thus improving the rigidity of the support strip 3-1 of the spring leaf 3. The two connection beams 3-3 are used to connect the clamping strip 3-2 with the support strip 3-1, so that the arc segment 3-1-2 at either end of the support strip 3-1 is individually supported, receives a stable force, and has a large bearing capacity.

What is claimed is:

1. A spring leaf, mainly applied in an overrunning clutch, and mounted on a retainer of the overrunning clutch for supporting a needle roller in suspension, comprising: a support strip (3-1), a clamping strip (3-2), and a connection beam (3-3), wherein the support strip (3-1) supports one of multiple needle rollers (2) in suspension, the connection beam (3-3) connects the support strip (3-1) and the clamping strip (3-2), and the main body of the clamping strip (3-2) is a straight strip (3-2-1), either end of which is provided with a V-shaped bended part (3-2-2) in the longitudinal direction of the straight strip (3-2-1), wherein a middle part of the support strip (3-1) is a straight segment (3-1-1), either end of which is provided with an arc segment (3-1-2), the straight segment (3-1-1) respectively intersects with the two arc segments (3-1-2), and end surfaces of the two arc segments (3-1-2) of the support strip (3-1) support the needle roller (2) in suspension; the number of the connection beams (3-3) is two, one end of the connection beam (3-3) is bended towards a first direction and connected to an end surface of the straight strip (3-2-1) of the clamping strip, the other end of the connection beam (3-3) is bended towards a second direction opposite to the first direction and connected to an end surface of the straight segment (3-1-1) of the support strip (3-1), and the position where the connection beam (3-3) and the support strip (3-1) are connected is close to the position where the straight segment (3-1-1) and the arc segment (3-1-2) are connected; and the expanded length of the arc segment (3-1-2) of the support strip (3-1) is the same as that of the straight segment (3-1-1).

2. An overrunning clutch provided with the spring leaf according to claim 1, comprising: the retainer (1), the multiple needle rollers (2), and multiple spring leaves (3), wherein the retainer (1) comprises a first and a second annular end edge (1-2) separated along a common axial direction, crossbeams (1-1) connecting the two annular end edges (1-2), and a window hole (1-3) formed between the annular end edges (1-2) and the crossbeams (1-1) for retaining one of the needle rollers (2); mounting grooves for the spring leaves (1-2-1) are respectively disposed at positions, corresponding to each crossbeam (1-1), on outer end surfaces of the first and second annular end edges (1-2), and the bottom of the mounting groove for the spring leaf (1-2-1) is V-shaped when cut along an axial direction of the retainer (1); the support strip (3-1) supports one of the needle rollers (2) in suspension, the connection beam (3-3) connects the support strip (3-1) and the clamping strip (3-2), and an inner surface of the V-shaped bended part (3-2-2) of the clamping strip (3-2) is matched with a bottom surface of the mounting groove for the spring leaf (1-2-1).

3. The overrunning clutch according to claim 2, wherein in a free state, an angle (α) formed between the V-shaped bended part (3-2-2) and the straight strip (3-2-1) of the clamping strip (3-2) is slightly smaller than an angle (α') formed between the mounting groove for the spring leaf (1-2-1) and the outer surface of the crossbeam (1-1).

* * * * *